United States Patent
Pleva et al.

(10) Patent No.: US 6,995,730 B2
(45) Date of Patent: Feb. 7, 2006

(54) ANTENNA CONFIGURATIONS FOR REDUCED RADAR COMPLEXITY

(75) Inventors: Joseph S. Pleva, Londonderry, NH (US); Michael J. Delcheccolo, Westford, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/293,880

(22) Filed: Nov. 13, 2002

(65) Prior Publication Data

US 2003/0098816 A1 May 29, 2003

Related U.S. Application Data

(63) Continuation-in-part of application No. 09/932,574, filed on Aug. 16, 2001, now Pat. No. 6,642,908.

(51) Int. Cl.
*H01Q 3/24* (2006.01)

(52) U.S. Cl. ........................................ 343/876; 343/853
(58) Field of Classification Search .......... 343/700 MS, 343/876, 853, 850; H01Q 3/24
See application file for complete search history.

(56) References Cited

U.S. PATENT DOCUMENTS 3,697,985 A  10/1972 Faris et al.
3,935,559 A  1/1976 Straffon et al.
3,940,696 A  2/1976 Nagy (Continued)

FOREIGN PATENT DOCUMENTS

| DE | 196 32 889 | 2/1998 |
| DE | 195 23 693 | 5/1998 |
| DE | 198 55 400 | 12/1998 |

(Continued)

OTHER PUBLICATIONS

International Search Report of PCT Application No. PCT/US01/25638 dated May 7, 2002.
Partial International Search Report of PCT Application No. PCT/US01/25642 dated May 27, 2002.
International Search Report of PCT Application No. PCT/US01/42065 dated May 14, 2002.

*Primary Examiner*—Hoanganh Le
(74) *Attorney, Agent, or Firm*—Daly, Crowley, Mofford & Durkee, LLP

(57) ABSTRACT

A transmit and receiving system including a first array including a first plurality of antenna elements disposed to provide a transmit antenna. The system further includes a second array having a second different plurality of antenna elements disposed to provide a receive antenna. The first array is coupled to a first switching system, which is operative to selectively form at least one transmit beam. The second array is coupled to a beam combining system, which is operative to selectively form a plurality of receive beams.

13 Claims, 8 Drawing Sheets

U.S. PATENT DOCUMENTS

| | | | |
|---|---|---|---|
| 3,974,501 A | 8/1976 | Ritzie | |
| 3,978,481 A | 8/1976 | Angwin et al. | |
| 4,003,049 A | 1/1977 | Sterzer et al. | |
| 4,008,473 A | 2/1977 | Hinachi et al. | |
| 4,008,475 A | 2/1977 | Johnson | |
| 4,035,797 A | 7/1977 | Nagy | |
| 4,063,243 A | 12/1977 | Anderson et al. | |
| 4,079,377 A | 3/1978 | zur Heiden et al. | |
| 4,143,370 A | 3/1979 | Yamanaka et al. | |
| 4,209,791 A | 6/1980 | Gerst et al. | |
| 4,217,582 A | 8/1980 | Endo et al. | |
| 4,246,585 A | 1/1981 | Mailloux | |
| 4,308,536 A | 12/1981 | Sims, Jr. et al. | |
| 4,348,675 A | 9/1982 | Senzaki et al. | |
| 4,349,823 A | 9/1982 | Tagami et al. | |
| 4,409,899 A | 10/1983 | Owen et al. | |
| 4,414,550 A | 11/1983 | Tresselt | |
| 4,507,662 A | 3/1985 | Rothenberg et al. | |
| 4,509,055 A | 4/1985 | Fassett | |
| 4,543,577 A | 9/1985 | Tachibana et al. | |
| 4,549,181 A | 10/1985 | Tachibana et al. | |
| 4,622,636 A | 11/1986 | Tachibana | |
| 4,673,937 A | 6/1987 | Davis | |
| 4,703,429 A | 10/1987 | Sakata | |
| 4,718,558 A | 1/1988 | Castaneda | |
| 4,901,083 A | 2/1990 | May et al. | |
| 4,962,383 A | 10/1990 | Tresselt | |
| 4,970,653 A | 11/1990 | Kenue | |
| 4,994,809 A | 2/1991 | Yung et al. | |
| 5,008,678 A | 4/1991 | Herman | |
| 5,014,200 A | 5/1991 | Chundrlik et al. | |
| 5,023,617 A | 6/1991 | Deering | |
| 5,045,856 A | 9/1991 | Paoletti | |
| 5,115,245 A | 5/1992 | Wen et al. | |
| 5,132,693 A * | 7/1992 | Werp | 342/179 |
| 5,134,411 A | 7/1992 | Adler | |
| 5,138,321 A | 8/1992 | Hammer | |
| 5,173,859 A | 12/1992 | Deering | |
| 5,189,426 A | 2/1993 | Asbury et al. | |
| 5,202,700 A | 4/1993 | Miller | |
| 5,235,316 A | 8/1993 | Qualizza | |
| 5,249,027 A | 9/1993 | Mathur et al. | |
| 5,249,157 A | 9/1993 | Taylor | |
| 5,252,981 A | 10/1993 | Grein et al. | |
| 5,268,692 A | 12/1993 | Grosch et al. | |
| 5,280,288 A | 1/1994 | Sherry et al. | |
| 5,285,207 A | 2/1994 | Asbury et al. | |
| 5,302,956 A | 4/1994 | Asbury et al. | |
| 5,315,303 A | 5/1994 | Tsou et al. | |
| 5,325,096 A | 6/1994 | Pakett | |
| 5,325,097 A | 6/1994 | Zhang et al. | |
| 5,339,075 A | 8/1994 | Abst et al. | |
| 5,341,144 A | 8/1994 | Stove | |
| 5,351,044 A | 9/1994 | Mathur et al. | |
| RE34,773 E | 11/1994 | Dombrowski | |
| 5,390,118 A | 2/1995 | Margolis et al. | |
| 5,394,292 A | 2/1995 | Hayashida | |
| 5,396,252 A | 3/1995 | Kelly | |
| 5,400,864 A | 3/1995 | Winner et al. | |
| 5,410,745 A | 4/1995 | Friesen et al. | |
| 5,414,643 A | 5/1995 | Blackman et al. | |
| 5,451,960 A | 9/1995 | Kastella et al. | |
| 5,454,442 A | 10/1995 | Labuhn et al. | |
| 5,467,072 A | 11/1995 | Michael | |
| 5,467,283 A | 11/1995 | Butsuen et al. | |
| 5,471,214 A | 11/1995 | Faibish et al. | |
| 5,479,173 A | 12/1995 | Yoshioka et al. | |
| 5,481,268 A | 1/1996 | Higgins | |
| 5,483,453 A | 1/1996 | Uemura et al. | |
| 5,485,155 A | 1/1996 | Hibino | |
| 5,485,159 A | 1/1996 | Zhang et al. |
| 5,486,832 A | 1/1996 | Hulderman |
| 5,493,302 A | 2/1996 | Woll et al. |
| 5,495,252 A | 2/1996 | Adler |
| 5,508,706 A | 4/1996 | Tsou et al. |
| 5,511,719 A | 4/1996 | Miyake et al. |
| 5,517,196 A | 5/1996 | Pakett et al. |
| 5,521,579 A | 5/1996 | Bernhard |
| 5,530,447 A | 6/1996 | Henderson et al. |
| 5,572,428 A | 11/1996 | Ishida et al. |
| 5,583,495 A | 12/1996 | Ben Lulu |
| 5,587,908 A | 12/1996 | Kajiwara |
| 5,613,039 A | 3/1997 | Wang et al. |
| 5,619,208 A | 4/1997 | Tamatsu et al. |
| 5,625,362 A | 4/1997 | Richardson |
| 5,627,510 A | 5/1997 | Yuan |
| 5,633,642 A | 5/1997 | Hoss et al. |
| 5,654,715 A | 8/1997 | Hayashikura et al. |
| 5,670,963 A | 9/1997 | Kubota et al. |
| 5,675,345 A | 10/1997 | Pozgay et al. |
| 5,678,650 A | 10/1997 | Ishihara et al. |
| 5,689,264 A | 11/1997 | Ishikawa et al. |
| 5,712,640 A | 1/1998 | Andou et al. |
| 5,715,044 A | 2/1998 | Hayes |
| 5,717,399 A | 2/1998 | Urabe et al. |
| 5,719,580 A | 2/1998 | Core |
| 5,731,778 A | 3/1998 | Nakatani et al. |
| 5,734,344 A | 3/1998 | Yamada |
| 5,757,074 A | 5/1998 | Matloubian et al. |
| 5,757,307 A | 5/1998 | Nakatani et al. |
| 5,767,793 A | 6/1998 | Agravante et al. |
| 5,771,007 A | 6/1998 | Arai et al. |
| 5,777,563 A | 7/1998 | Minissale et al. |
| 5,805,103 A | 9/1998 | Doi et al. |
| 5,808,561 A | 9/1998 | Kinoshita et al. |
| 5,808,728 A | 9/1998 | Uehara |
| 5,812,083 A | 9/1998 | Johnson et al. |
| 5,818,355 A | 10/1998 | Shirai et al. |
| 5,839,534 A | 11/1998 | Chakraborty et al. |
| 5,905,472 A | 5/1999 | Wolfson et al. |
| 5,923,280 A | 7/1999 | Farmer |
| 5,926,126 A | 7/1999 | Engelman |
| 5,929,802 A | 7/1999 | Russell et al. |
| 5,938,714 A | 8/1999 | Satonaka |
| 5,940,011 A | 8/1999 | Agravante et al. |
| 5,949,366 A | 9/1999 | Herrmann |
| 5,959,570 A | 9/1999 | Russell |
| 5,977,904 A | 11/1999 | Mizuno et al. |
| 5,978,736 A | 11/1999 | Greendale |
| 5,999,092 A | 12/1999 | Smith et al. |
| 5,999,119 A | 12/1999 | Carnes et al. |
| 5,999,874 A | 12/1999 | Winner et al. |
| 6,011,507 A | 1/2000 | Curran et al. |
| 6,018,308 A | 1/2000 | Shirai |
| 6,026,347 A | 2/2000 | Schuster |
| 6,026,353 A | 2/2000 | Winner |
| 6,028,548 A | 2/2000 | Farmer |
| 6,037,860 A | 3/2000 | Zander et al. |
| 6,037,894 A | 3/2000 | Pfizenmaier et al. |
| 6,040,796 A | 3/2000 | Matsugatani et al. |
| 6,043,772 A | 3/2000 | Voigtlaender et al. |
| 6,049,257 A | 4/2000 | Hauk |
| 6,057,797 A | 5/2000 | Wagner |
| 6,069,581 A | 5/2000 | Bell et al. |
| 6,070,682 A | 6/2000 | Iaogai et al. |
| 6,075,492 A | 6/2000 | Schmidt et al. |
| 6,076,622 A | 6/2000 | Chakraborty et al. |
| 6,085,151 A | 7/2000 | Farmer et al. |
| 6,087,975 A | 7/2000 | Sugimoto et al. |
| 6,091,355 A | 7/2000 | Cadotte, Jr. et al. |
| 6,097,331 A | 8/2000 | Matsugatani et al. |

| | | | |
|---|---|---|---|
| 6,097,931 A | 8/2000 | Weiss et al. | |
| 6,104,336 A | 8/2000 | Curran et al. | |
| 6,107,956 A | 8/2000 | Russell et al. | |
| 6,114,985 A | 9/2000 | Russell et al. | |
| 6,127,965 A | 10/2000 | McDade et al. | |
| 6,130,607 A | 10/2000 | McClanahan et al. | |
| 6,147,637 A | 11/2000 | Morikawa et al. | |
| 6,147,638 A | 11/2000 | Rohling et al. | |
| 6,154,168 A | 11/2000 | Egawa et al. | |
| 6,160,514 A * | 12/2000 | Judd | 343/700 MS |
| 6,161,073 A | 12/2000 | Tange et al. | |
| 6,163,252 A | 12/2000 | Nishiwaki | |
| 6,184,819 B1 | 2/2001 | Adomat et al. | |
| 6,188,950 B1 | 2/2001 | Tsutsumi et al. | |
| 6,198,426 B1 | 3/2001 | Tamatsu et al. | |
| 6,198,434 B1 | 3/2001 | Martek et al. | |
| 6,215,438 B1 | 4/2001 | Oswald et al. | |
| 6,225,918 B1 | 5/2001 | Kam | |
| 6,232,910 B1 | 5/2001 | Bell et al. | |
| 6,233,516 B1 | 5/2001 | Egawa | |
| 6,252,560 B1 | 6/2001 | Tanaka et al. | |
| 6,255,984 B1 | 7/2001 | Kreppold et al. | |
| 6,256,573 B1 | 7/2001 | Higashimata | |
| 6,259,495 B1 | 7/2001 | Maeda | |
| 6,265,990 B1 | 7/2001 | Isogai et al. | |
| 6,268,793 B1 | 7/2001 | Rossi | |
| 6,269,298 B1 | 7/2001 | Seto | |
| 6,278,400 B1 | 8/2001 | Cassen et al. | |
| 6,297,732 B2 | 10/2001 | Hsu et al. | |
| 6,307,622 B1 | 10/2001 | Lewis | |
| 6,307,882 B1 * | 10/2001 | Marzetta | 375/224 |
| 6,317,073 B1 | 11/2001 | Tamatsu et al. | |
| 6,317,075 B1 | 11/2001 | Heide et al. | |
| 6,317,090 B1 | 11/2001 | Nagy et al. | |
| 6,320,547 B1 | 11/2001 | Fathy et al. | |
| 6,327,530 B1 | 12/2001 | Nishimura et al. | |
| 6,329,952 B1 | 12/2001 | Grace | |
| 6,330,507 B1 | 12/2001 | Adachi et al. | |
| 6,335,705 B1 | 1/2002 | Grace et al. | |
| 6,339,369 B1 | 1/2002 | Paranjpe | |
| 6,345,227 B1 | 2/2002 | Egawa et al. | |
| 6,351,702 B1 | 2/2002 | Tange et al. | |
| 6,366,235 B1 | 4/2002 | Mayer et al. | |
| 6,463,303 B1 * | 10/2002 | Zhao | 455/562.1 |

FOREIGN PATENT DOCUMENTS

| | | |
|---|---|---|
| DE | 198 50 128 | 5/1999 |
| EP | 0 398 712 | 5/1990 |
| EP | 0 398 555 | 11/1990 |
| EP | 0 484 995 | 5/1992 |
| EP | 0 642 190 A1 | 12/1993 |
| EP | 0 668 627 | 8/1995 |
| EP | 0 784 213 | 1/1996 |
| EP | 0 883 208 | 12/1998 |
| EP | 0 887 658 | 12/1998 |
| EP | 0 932 052 | 7/1999 |
| EP | 0 978 729 A2 | 2/2000 |
| EP | 0 982 173 | 3/2000 |
| EP | 1 020 989 | 7/2000 |
| FR | 2 709 834 | 9/1993 |
| GB | 1143997 | 2/1969 |
| GB | 2 315 644 | 2/1998 |
| JP | 2000-114866 | 4/2000 |

OTHER PUBLICATIONS

International Search Report of PCT Application No. PCT/US01/25594 dated May 7, 2002.

G.S. Dow, et al. "Monolithic Receivers with Integrated Temperature Compensation Function", IEEE GaAs IC Symposium, 1991, pp. 267–269.

International Search Report of PCT Application No. PCT/US01/25682 dated May 14, 2002.

Sangster, Alan et al. "A Moment Method Analysis of a Tranverse Slot Fed by a Boxed Stripline", (No Date) pp. 146–149.

Schaubert, Daniel H. et al. "Moment Method Analysis of Infinite Stripline–Fed Tapered Slot Antenna Arrays with a Ground Plane", IEEE Transactions on Antennas and Propagation, vol. 42, No. 8, Aug. 1994, pp. 1161.

Smith, Peter "Tranverse Slot Radiator in the Ground–Plane of Enclosed Stripline", 10th International Conference on Antennas and Propagation 14. Apr. 17, 1997, 5 pages.

Theron, Isak Petrus et al. "On Slotted Waveguide Antenna Design at Ka–Band", IEEE Trans. vol. 32, Oct. 1984, pp. 1425–1426.

International Search Report of PCT Application No. PCT/US01/25676 dated Dec. 21, 2001.

International Search Report of PCT Application No. PCT/US01/25677 dated Apr. 17, 2002.

Barnett, Roy I. et al. "A Feasibility Study of Stripline–Fed Slots Arranged as a Planar Array with Circular Grid and Circular Boundary", IEEE, 1989, pp. 1510–1515.

Bhattacharyya, Arum, et al. "Analysis of Stripline–Fed Slot–Coupled Patch Antennas with Vias for Parallel–Plate Mode Suppressioin", IEEE Transactions on Antennas and Propagation, vol. 46, No. 4, Apr. 1998, pp. 538–545.

Clouston E.N. et al. "A Triplate Slot Antenna Developed for Time–Domain Measurements on Phased Arrays", 1998, pp. 312–315.

Das, Nirod K. et al. "Multiport Scattering Analysis of General Multilayered Printed Antennas Fed by Multiple Feed Ports: Part II–Applications", IEEE, 1992, pp. 482–491.

Katehi, Pisti B. et al. "Design of a Low Slidelobe Level Stripline Fed Slot Array Cobered by a Dielectric Layer", 1989, pp. 978–981.

Kimura, Yuichi et al. "Alternating Phase Single–Layer Slotted Waveguide Arrays at 25GHz Band", IEEE, 1999, pp. 142–145.

Muir, A., "Analysis of Stripline/Slot Transition", Electronics Letter, vol. 26 No. 15, pp. 1160–1161.

Sakaibara, Kunio et al. "A Single Layer Slotted Waveguide Array for 22GHz Band Radio System Between Mobile Base Stations", IEEE, 1994, pp. 356–359.

EP Search Report; Application No. EP 01 96 5964; dated Aug. 19, 2004.

* cited by examiner

ANTENNA CONFIGURATIONS FOR REDUCED RADAR COMPLEXITY

CROSS-REFERENCE TO RELATED APPLICATION

This application is a Continuation-in-Part of and claims the benefit of U.S. patent application Ser. No. 09/932,574, filed on Aug. 16, 2001, now U.S. Pat. No. 6,642,908 which is hereby incorporated by reference herein in its entirety.

STATEMENTS REGARDING FEDERALLY SPONSORED RESEARCH

Not applicable.

FIELD OF THE INVENTION

This invention relates to a transmit/receive system and more particularly to a transmit/receive system which utilizes an array antenna having asymmetric transmit and receive antennas.

BACKGROUND OF THE INVENTION

As is known in the art, there is an increasing trend to include radar systems in commercially available products. For example, it is desirable to include radar systems in automobiles, trucks boats, airplanes and other vehicle. Such radar systems must be compact and relatively low cost.

Furthermore, some applications have relatively difficult design parameters including restrictions on the physical size of the structure in addition to minimum operational performance requirements. Such competing design requirements (e.g. low cost, small size, high performance parameters) make the design of such radar systems relatively challenging. Among the design challenges is the challenge to provide an antenna system which meets the design goals of being low cost, compact and high performance.

In automotive radar systems, for example, cost and size considerations are of considerable importance. Furthermore, in order to meet the performance requirements of automotive radar applications, (e.g. coverage area) an array antenna is required. Some antenna elements which have been proposed for use in antenna arrays manufactured for automotive radar applications include patch antenna elements, printed dipole antenna elements and cavity backed patch antenna elements. Each of these antenna elements have one or more drawbacks when used in an automotive radar application.

For example, patch antenna elements and cavity backed patch antenna elements each require a relatively large amount of substrate area and thickness. Array antennas for automotive applications, however, have only a limited amount of area for reasons of compactness and cost. Printed dipole antennas can operate in a high density circuit environment, however, array antennas provided from printed dipole antenna elements give rise to "blind spots" in the antenna radiation pattern.

It would, therefore, be desirable to provide an antenna array that is compact which can operate in a high density circuit environment, and is relatively low cost to manufacture and yet provides an antenna array having relatively high performance characteristics.

SUMMARY OF THE INVENTION

In accordance with principles of the present invention, set forth is a transmit and receive system that is relatively compact and can operate in a high density circuit environment, and which is relatively low cost to manufacture and yet provides an antenna array having relatively high performance characteristics.

The transmit and receive system includes a first array having a first plurality of antenna elements disposed to provide a transmit antenna. The system further includes a second array having a second different plurality of antenna elements disposed to provide a receive antenna. A beam switching system can be coupled to the first array, which beam switching system is operative to selectively form at least one transmit beam. A beam combining system can be coupled to the second array, which beam combining system is operative to selectively form a plurality of receive beams.

In one aspect, the first array includes fewer antenna elements than the second array. Further, the first plurality of antenna elements are arranged into a transmit array including approximately four elements in azimuth and approximately three elements in elevation. In this arrangement, as well as in other arrangements, the transmit array includes approximately twelve elements. The second plurality of antenna elements are arranged into a receive array including approximately eight elements in azimuth and approximately six elements in elevation. In this arrangement, as well as in other arrangements, the receive array includes approximately forty-eight elements.

In another aspect, the second plurality of antenna elements are arranged into a receive array including approximately four elements in azimuth and approximately six elements in elevation. In this arrangement, as well as in other arrangements, the receive array includes approximately twenty-four elements.

In one aspect, the beam switching system includes a first beamforming circuit having a plurality of antenna ports and a plurality of switch ports. Each of the plurality of antenna ports are coupled to a corresponding one of the first plurality of antenna elements. Furthermore, the beam switching system includes a first switched beam combining circuit having an input port and a plurality of output ports. Each of the plurality of output ports are coupled to a corresponding one of the plurality of switch ports of said first beamforming circuit. At least one attenuator can also be coupled to each one of the plurality of switch ports of the first beamforming circuit.

In one aspect, the beam combining system includes a second switched beamforming circuit having a plurality of switch ports and a plurality of output ports. Each of the plurality of antenna ports are coupled to a corresponding one of the second plurality of antenna elements. In addition, the beam combining system includes a switched beam combining system. The switched beam combining system includes a first switch having an output port and a plurality of input ports. Each of the plurality of input ports are coupled to respective first ones of the plurality of switch ports of the second beamforming circuit.

The switched beam combining system further includes a second switch having an output port and a plurality of input ports. Each of the plurality of input ports are coupled to respective second ones of the plurality of switch ports of the second beamforming circuit. Additionally, the switched beam combining system includes a power divider circuit having a first input coupled to the output port of the first switch, a second input coupled to the output port of the second switch and an output coupled to an output of said switched beam combining system. A receiver is further coupled to the output of said switched beam combining system.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
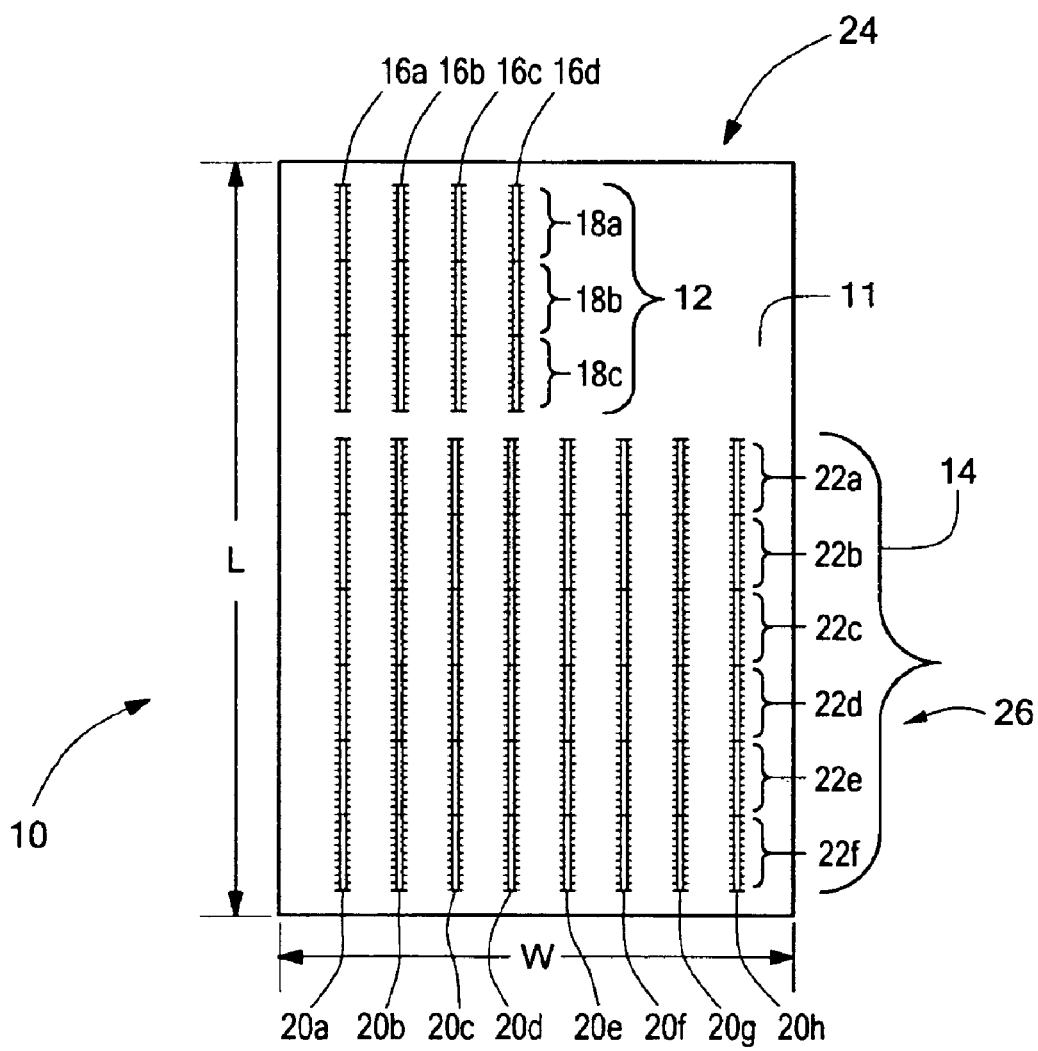
FIG. 1 is a top plan view of an asymmetric antenna array in accordance with an embodiment of the present invention.

Referring to FIG. 1, set forth is an asymmetric antenna array 10 provided from a substrate 11 having a length L and width W. The asymmetric antenna array 10 includes a first plurality of antenna elements disposed on the substrate 11 to provide a transmit antenna array 12 and a second plurality of antenna elements disposed on the substrate 11 to provide a receive antenna array 14. In one embodiment, the transmit antenna array 12 includes four rows 16a–16d and three columns 18a–18c and the receive antenna array 14 includes eight rows 20a–20h and six columns 22a–22f. Thus, the transmit antenna array 12 includes twelve radiating elements (or more simply "radiators" or "elements"), generally denoted 24, with four elements in azimuth and three elements in elevation. Additionally, the receive antenna array 14 includes forty-eight radiating elements (or more simply "radiators" or "elements"), generally denoted 26, with eight elements in azimuth and six elements in elevation.

It should be understood that a number of permutations of arrangements and quantities of radiators 24 can be disposed on the substrate 11 to define the transmit array 12 as long as the quantity of radiators 24 differs from the quantity of radiators 26 disposed on the substrate 11 to define the receive array 14. Similarly, it should be understood that a number of permutations of arrangements and quantities of radiators 26 can be disposed on the substrate 11 to define the receive array 14 as long as the quantity of radiators 26 differs from the quantity of radiators 24 disposed on the substrate 11 to define the transmit array 12. As will be described below in conjunction with FIGS. 2–5, the transmit array 12 is coupled to a transmit signal path and the receive array 14 is coupled to a receive signal path.

Figure 2:
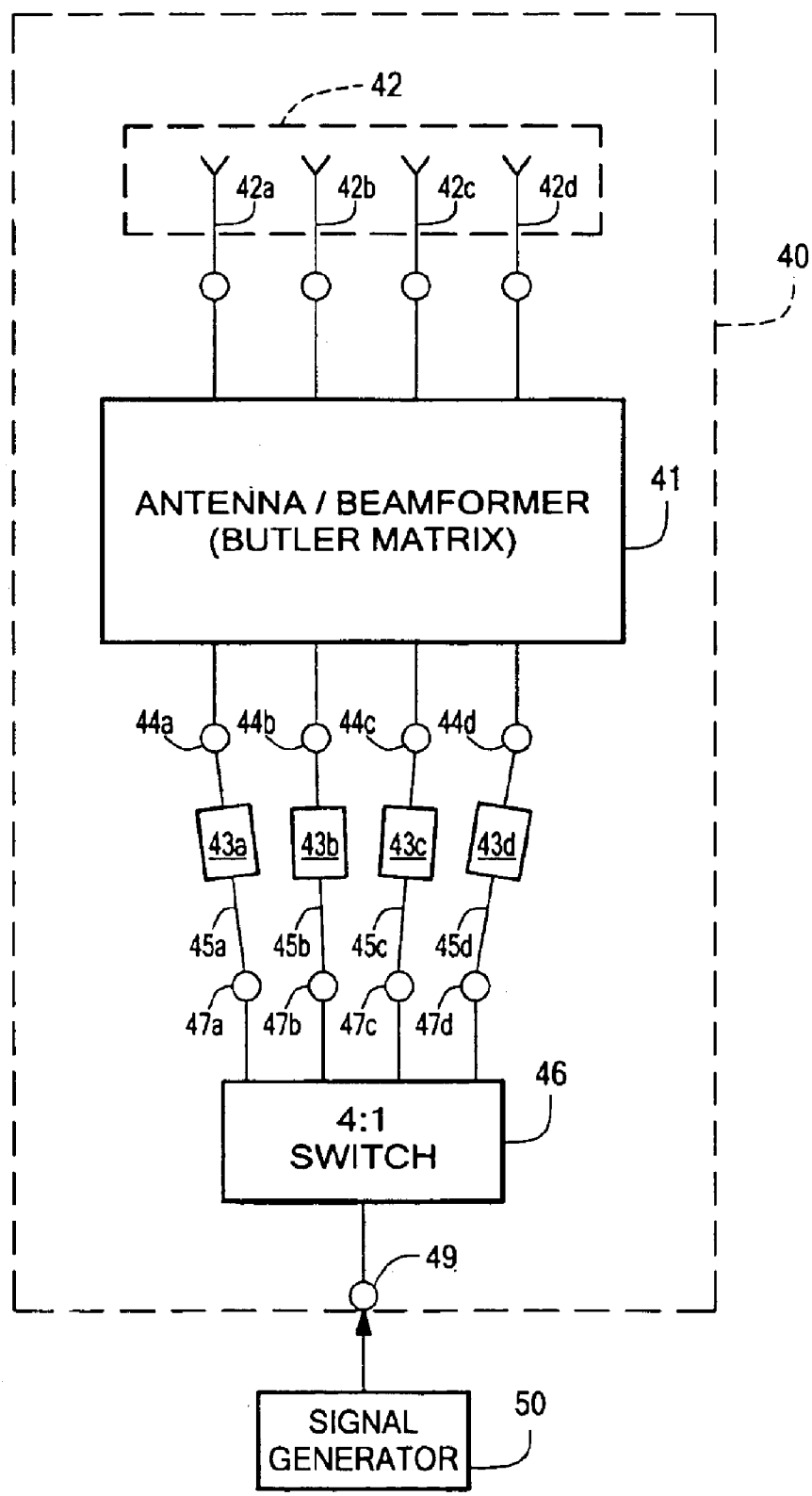
FIG. 2 is a block diagram of a beam switching system adapted for coupling to the asymmetric antenna array, as shown in FIG. 1.

Referring to FIG. 2, in the exemplary embodiment, a beam switching system 40 includes a beamformer circuit 41 which in this particular embodiment is shown as a Butler matrix beam forming network 41 having a plurality of antenna element ports 42a–42d generally denoted 42 and a plurality of switch ports 44a–44d. Transmission lines 45a–45d couple each of the switch ports 44a–44d to a switched beam combining circuit 46. Optionally, one, some or all of the transmission lines 45a–45d can include amplitude control elements 43a–43d which may be provided, for example, as an attenuator or as an amplifier. The amplitude control elements 43a–43d may be used for example, to control the signal levels in individual beams emitted from each of the corresponding antenna element ports 42a–42d, as described above. Although not shown in the figures, similar amplitude control elements can also be coupled between the beamformer circuit 41 and some or all of the antenna element ports 42a–42d, which provides additional control to the signal levels in individual beams emitted from each of the antenna element ports 42a–42d.

In the exemplary embodiment, the signal path between beamformer port 44a and switch port 47a includes an amplitude control element as does the signal path between beamformer port 44d and switch port 47d. In this arrangement, the signal levels in individual beams emitted from each of the antenna element ports 42a–42d will be substantially equivalent. In other words, the signal levels in individual beams emitted from each of the antenna element ports 42a–42d will include substantially equivalent radiant energy.

The switched beam combining circuit 46 is here provided from a single pole four throw switch 46 having a common port 49 coupled to the output port of the beam switching system 40. The common port 49 is coupled to a signal generator 50.

In one embodiment, each of the antenna element ports 42a–42d are coupled to corresponding ones of the four rows 16a–16d of the transmit antenna array 12, shown in FIG. 1. It should be understood that the plurality of antenna element ports 42a–42d of the antenna port 42 is scalable. Thus, in the event that an array antenna having more than four rows was used, it would be possible to make appropriate changes to the beamformer circuit to provide the beamformer circuit having an appropriate number of antenna ports 42.

Figure 3:
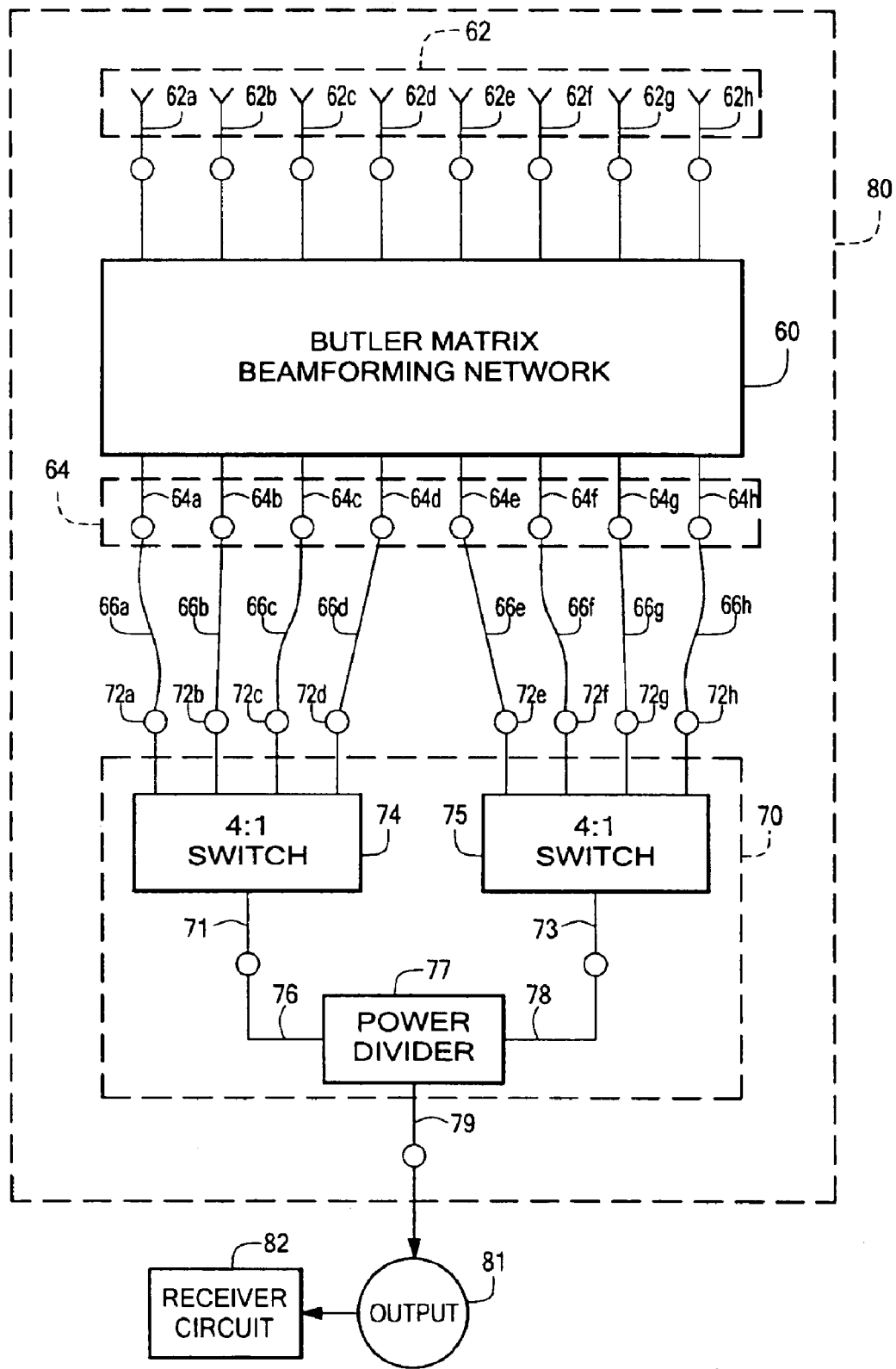
FIG. 3 is a block diagram of beam combining system adapted for coupling to the asymmetric antenna array, as shown in FIG. 1.

Referring now to FIG. 3, a beam combining system 80 includes a beamforming circuit 60 having a plurality of antenna element ports 62a–62h generally denoted 62 and a plurality of switch ports 64a–64h generally denoted 64. In this exemplary embodiment, the beamformer circuit is shown as a Butler matrix beam forming network.

The switch ports 64 are coupled through transmission lines 66a–66h to a switched beam combining circuit 70. As is known, the port phasing for a Butler matrix have 180° phase difference and the curved signal paths 66a, 66c, 66f, 66h represent 180° differential line lengths required to bring all of the ports in phase with each other. The switched beam combining circuit 70 is here provided from a pair of single pole four throw switches 74, 75. Each of the switches 74, 75 include a common port 71, 73 coupled to respective output ports 76, 78 of a power divider circuit 77. The power divider circuit 77 is provided such that a signal fed to an input port 79 has an equal phase and power level at the output ports 76, 78. In this example, the port 79 is coupled to a receiver circuit 82, via an output port 81.

In one embodiment, the plurality of antenna element ports 62a–62h are coupled to corresponding ones of the rows 20a–20h of the receive antenna array 14, shown in FIG. 1. It should be understood that the plurality of antenna element ports 62a–62h of the antenna port 62 is scalable to accommodate a plurality of different receive antenna arrays (not shown) having a plurality of rows of radiators or elements.

Figure 4:
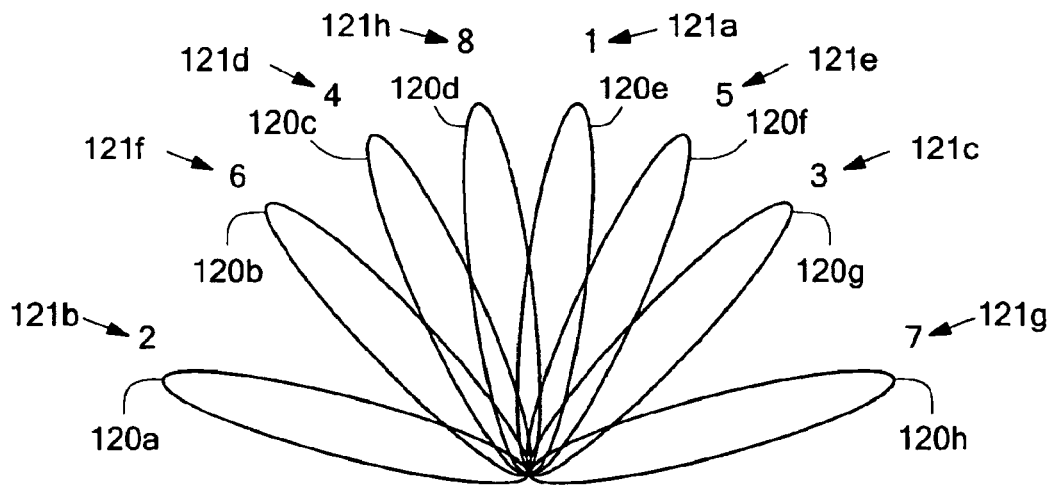
FIG. 4 is an illustration of a plurality of beams generated by a Butler Matrix circuit of the beam combining system of FIG. 3.

Referring to FIG. 4, in this particular embodiment, the Butler beamforming circuit 60 (FIG. 3) forms eight beams 120a–120h. That is, by providing an input signal to one of the plurality of antenna ports 62 of the Butler matrix 60, which input signal is provided from the receive antenna 26, the Butler matrix 60 generates a corresponding one of the beams 120a–120h at a corresponding one of the plurality of switch ports 64 thereof. The calculations for determining the beam locations can be found using the equations below:

Wavelength (inches):

$$\lambda = \frac{11.81}{24}$$

Number of Elements: N=8
Element Spacing (Azimuth): d=0.223
Beam Location (Degrees):

$$beamloc(M) = a\sin\left[\frac{\lambda}{N \cdot d} \cdot \left(M - \frac{1}{2}\right)\right] \cdot \frac{180}{\pi}$$

Beam Number:

$$M = 1 \ldots \frac{N}{2}$$

Figures 6, 7:
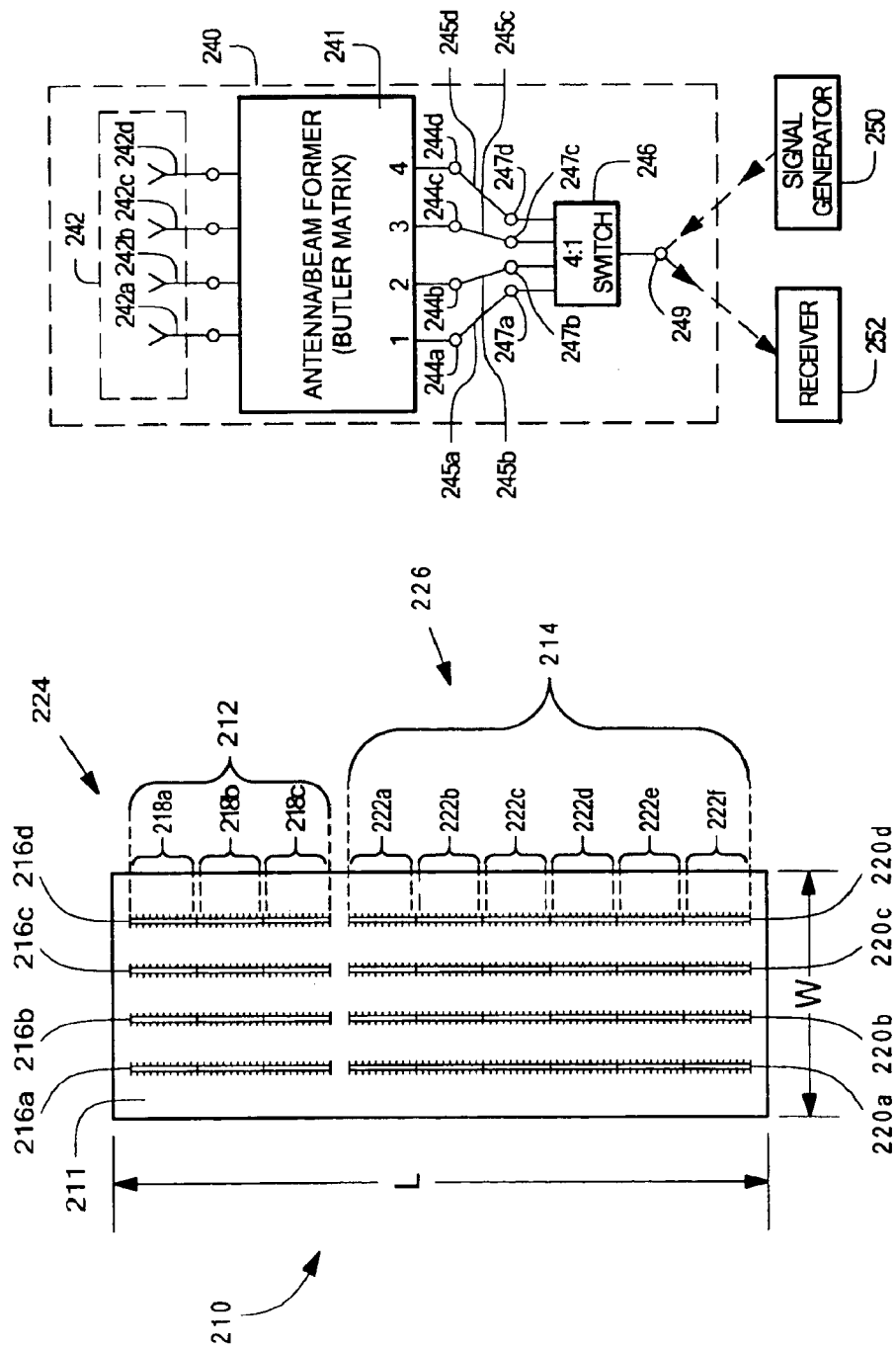
FIG. 6 is a top plan view of an asymmetric antenna array in accordance with another embodiment of the present invention.
FIG. 7 is a block diagram of beam switching system and/or beam combining system adapted for coupling to the asymmetric antenna array, as shown in FIG. 6.

If the array is provided having an array lattice spacing of 0.223" in azimuth, the beam locations shown in FIG. 4 are provided. In one embodiment, the differential line length value, n is selected to be $\frac{1}{16}\lambda$ which corresponds to 0.0127 inch at a frequency of 24 GHz. FIG. 7 also illustrates which beam-ports in FIG. 6 produce which beams.

Figure 4A:
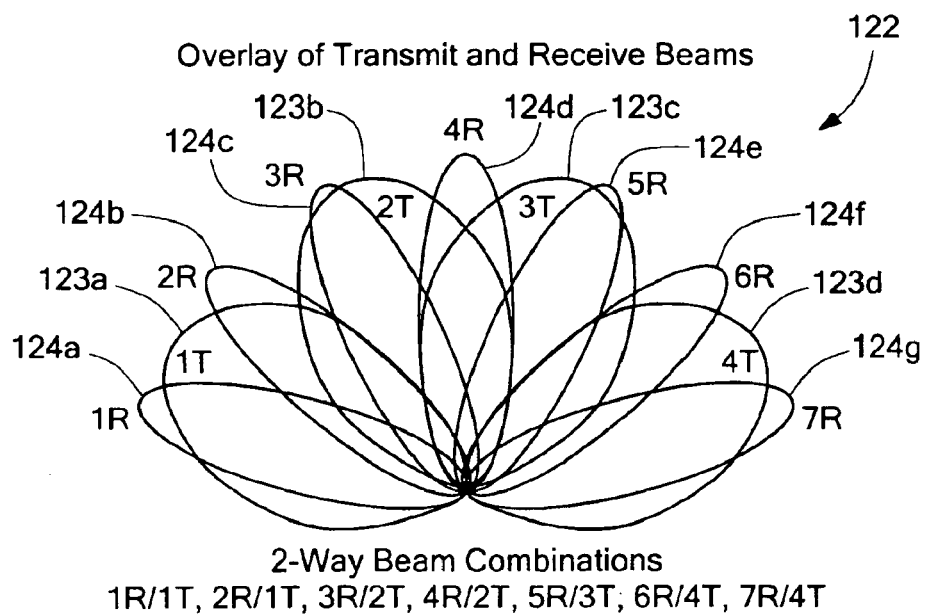
FIG. 4A is an illustration of an overlay of a plurality of receive beams generated by the beam combining system of FIG. 3 and a plurality of transmit beams generated by the beam switching system of FIG. 2.

Referring now to FIG. 4A, a calculated antenna radiation pattern 122 includes four transmit beams 123a–123d and seven receive beams 124a–124g which can be used in a radar system. The four transmit beams are formed by feeding a transmit signal produced by signal source 50 (FIG. 2) through the switch 46. Depending upon the switch path which is selected, a signal is provided to one of the Butler matrix ports 44a–44d (FIG. 2). The Butler beamforming circuit 40 then forms one of the four transmit antenna beams 123a–123d. That is, by providing an input signal to one of the Butler matrix input ports 44a–44d (FIG. 2), the transmit antenna 12 (FIG. 1) produces a corresponding one of the beams 123a–123d.

The seven receive beams 124a–124g are provided by combining predetermined ones of the eight beams 120a–120h (FIG. 4) formed by the Butler Matrix 60 (FIG. 3) as discussed above. Adjacent beams (e.g. beams 120a, 120b from FIG. 4) can be combined to produce beam 124a as illustrated in FIG. 4A. Since beams out of a Butler Matrix by definition are orthogonal, combining beams in azimuth produces a cos(θ) taper with a peak sidelobe level of 23 dB (with respect to the beam maximum).

The locations of the combined received beams are listed in the Table below.

TABLE

| Combined Beam | Beam Location |
|---|---|
| 8,1 | 0 |
| 4,8 & 1,5 | +/−16 |
| 6,4 & 5,3 | +/−34 |
| 2,6 & 3,7 | +/−57 |

In elevation, there is also a 25 dB Chebyshev taper and a 15° beam steer.

Figure 5:
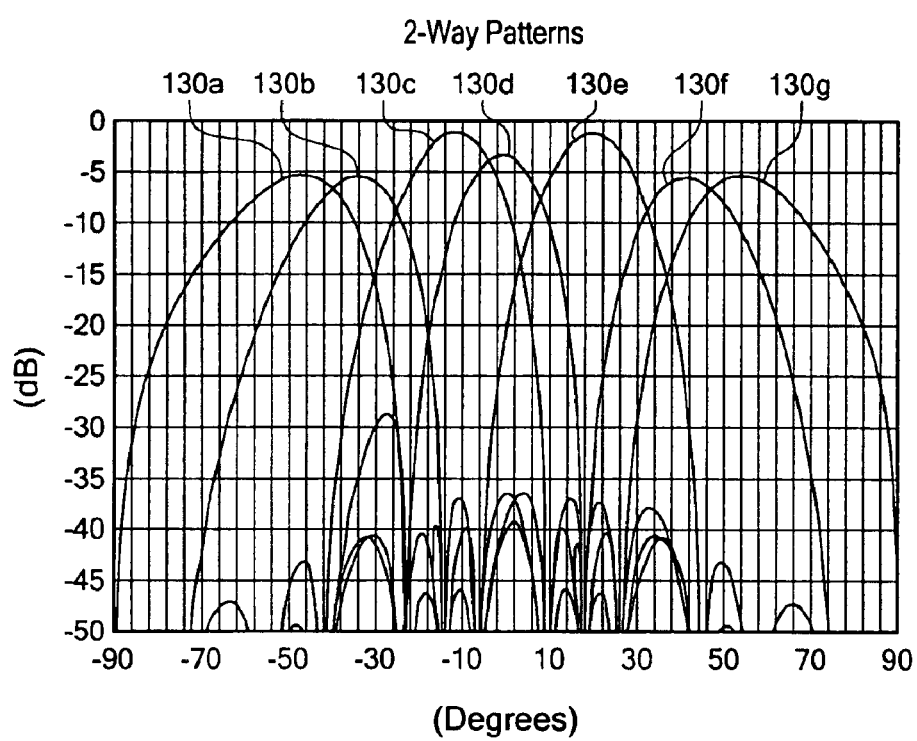
FIG. 5 is a graph illustrating radiation patterns associated with the plurality of receive beams generated by the beam combining system of FIG. 3.

Referring to FIG. 5, a two-way radiation pattern having seven antenna beams 130a–130g is produced by an array antenna having an array of antenna elements provided as described above in conjunction with FIG. 1 and having the transmit array 12 coupled to a transmit path of the type described above in conjunction with FIG. 2 and having the receive array 14 coupled to a receive path of the type described above in conjunction with FIG. 3.

Referring to FIG. 6, set forth is another embodiment of an asymmetric antenna array 210 in accordance with the present invention. The asymmetric antenna array 210 can be disposed on a substrate 211 having a length L and width W. The asymmetric antenna array 210 includes a first plurality of antenna elements disposed on the substrate 211 to provide a transmit antenna array 212 and a second plurality of antenna elements disposed on the substrate 211 to provide a receive antenna array 214. In one embodiment, the transmit antenna array 212 includes four rows 216a–216d and three columns 218a–218c and the receive antenna array 214 includes four rows 220a–220d and six columns 222a–222f. Thus, the transmit antenna array 212 includes twelve radiating elements (or more simply "radiators" or "elements"), generally denoted 224, with four elements in azimuth and three elements in elevation. Additionally, the receive antenna array 214 includes twenty-four radiating elements (or more simply "radiators" or "elements"), generally denoted 226, with four elements in azimuth and six elements in elevation.

It should be understood that a number of permutations of arrangements and quantities of radiators 224 can be disposed on the substrate 211 to define the transmit array 212 as long as the quantity of radiators 224 differs from the quantity of radiators 226 disposed on the substrate 211 to define the receive array 214. Similarly, it should be understood that a number of permutations of arrangements and quantities of radiators 226 can be disposed on the substrate 211 to define the receive array 214 as long as the quantity of radiators 226 differs from the quantity of radiators 224 disposed on the substrate 211 to define the transmit array 212.

Referring to FIG. 7, in the exemplary embodiment, a beam switching system 240 includes a beamformer circuit 241, which in this particular embodiment is shown as a Butler matrix beam forming network 241 having a plurality of antenna element ports 242a–242d generally denoted 242 and a plurality of switch ports 244a–244d. Transmission lines 245a–245d couple each of the switch ports 244a–244d to a switched beam combining circuit 246. Optionally, one, some or all of the transmission lines 245a–245d can include an amplitude control element, which is similar to that shown and described above in connection with FIG. 2.

In the exemplary embodiment, the signal path between beamformer port 244a and switch port 247a includes an amplitude control element as does the signal path between beamformer port 244d and switch port 247d.

The switched beam combining circuit 246 is here provided from a single pole four throw switch 246 having a common port 249 coupled to the output port of the beam switching system 240. The common port 249 can be coupled to a signal generator 250 when the beam switching system 240 is employed to transmit a plurality of signal to the transmit antenna 224 (FIG. 6), via the antenna port 242. In an embodiment, each of the antenna element ports 242a–242d are coupled to corresponding ones of the four rows 216a–216d of the transmit antenna array 212, shown in FIG. 6. It should be understood that the plurality of antenna element ports 242a–242d of the antenna port 242 is scalable. Thus, in the event that a transmit array antenna 212 having more than four rows was used, it would be possible to make appropriate changes to the beamformer circuit 241 of the beam switching system 240 to provide the beamformer circuit 241 having an appropriate number of antenna ports 242.

In addition, it should be understood that a beam combining system (not shown) can be similarly constructed and arranged as the beam switching system 240. Therefore, for illustrative purposes, the beam switching system 240 can be redefined as the beam combining system 240, where like components are referred to using like reference designations. The beam combing system 240 includes a signal receiver circuit 252 coupled to the common output port 249 of the switch 246. In an embodiment, each of the antenna element ports 242a–242d are coupled to corresponding ones of the four rows 220a–220d of the receive antenna array 214, shown in FIG. 6. It should be understood that the plurality of antenna element ports 242a–242d of the antenna port 242 is scalable. Thus, in the event that a receive array antenna 214 having more than four rows was used, it would be possible to make appropriate changes to the beamformer circuit 241 of the beam combining circuit 240 to provide the beamformer circuit 241 having an appropriate number of antenna ports 242.

Figure 8:
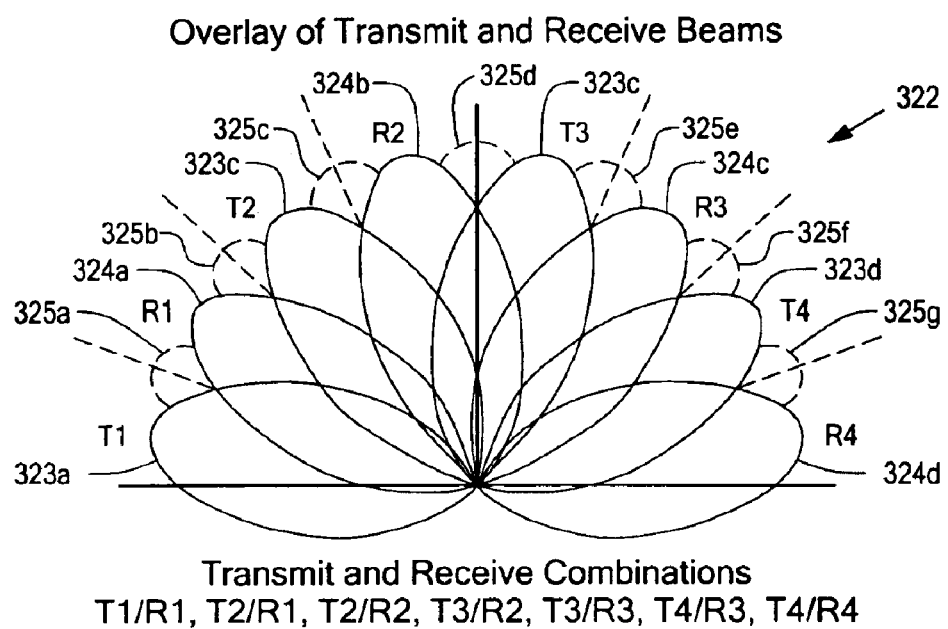
FIG. 8 is an illustration of an overlay of a plurality of receive beams and a plurality of transmit beams generated by the beam switching system and/or beam combining system of FIG. 7.

Referring to FIG. 8, shown is an overlay 322 (illustration does not depict actual beam shapes and locations) and combination of transmit beams 323a–323d and receive beams 324a–324d, which operate to form the seven two-way beams 325a–325g, as described herein. In the exemplary embodiment, the transmit beams 323a–323d and receive beams 324a–324d are squinted or phase-shifted approximately one-half a beam width in opposite direction with respect to each other. Furthermore, adjacent transmit beams 323a–323d and receive beams 324a–324d can be combined to form the seven two-way beams 325a–325g.

In an embodiment, the transmit beam 323a can be combined with receive beam 324a to form two-way beam 325a. Further, the transmit beam 323b can be combined with receive beam 324a to form two-way beam 325b. The transmit beam 323b can be combined with receive beam 324b to form two-way beam 325c. The transmit beam 323c can be combined with receive beam 324b to form two-way beam 325d. The transmit beam 323c can be combined with receive beam 324c to form two-way beam 325e. The transmit beam 323d can be combined with receive beam 324c to form two-way beam 325f. Finally, the transmit beam 323d can be combined with receive beam 324d to form two-way beam 325g.

Figure 9:
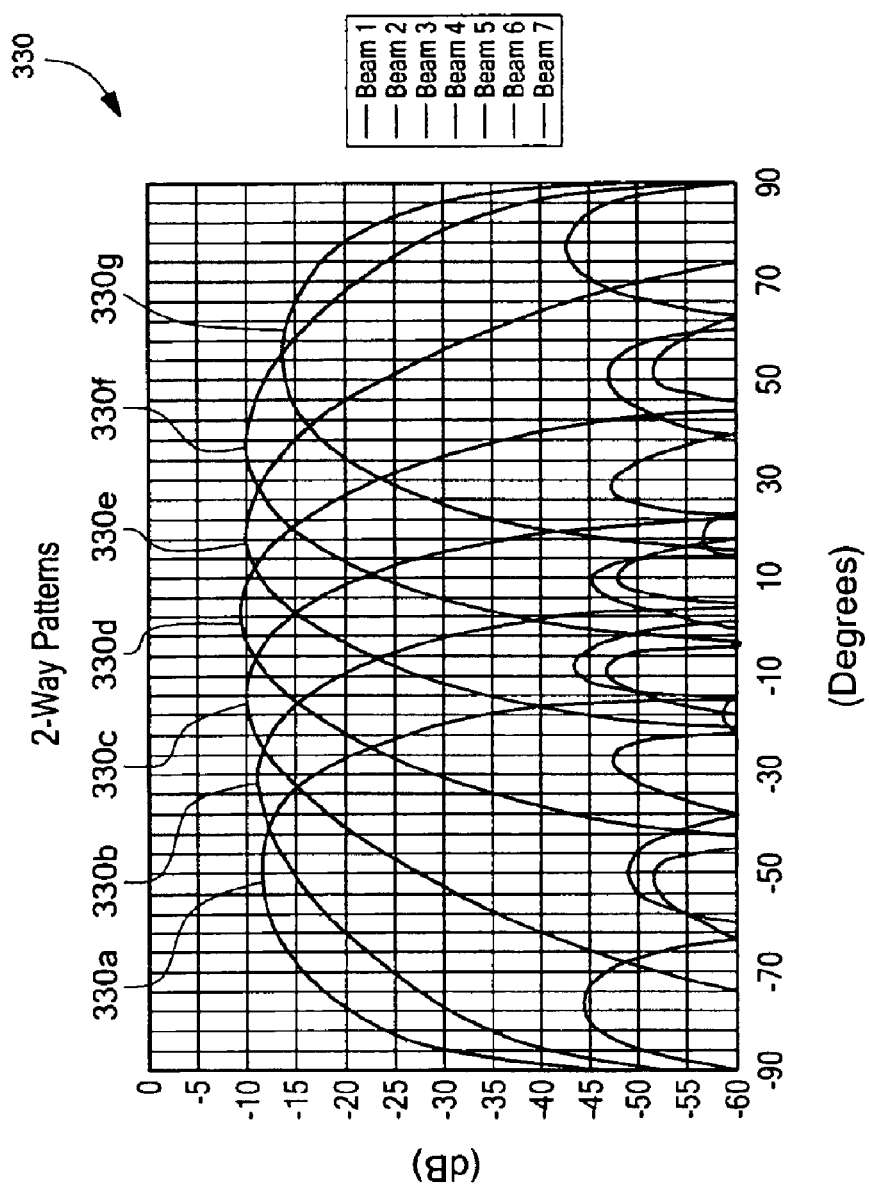
FIG. 9 is a graph illustrating radiation patterns associated with the plurality of receive beams generated by the beam switching system and/or beam combining system of FIG. 7.

Referring to FIG. 9, a two-way radiation pattern having seven antenna beams 330a–330g is produced by an array antenna having an array of antenna elements provided as described above in conjunction with FIG. 6 and having the transmit antenna array 212 and the receive antenna array 214 coupled to a transmit and/or receive path of the type described above in conjunction with FIG. 7. FIG. 9 shows a typical two-way antenna radiation pattern 330 corresponding to the seven two-way beams 325a–325g, as shown in FIG. 8. The number of beams and beam coverage are substantially the same as that shown and described above with respect to FIG. 5. The side-lobe levels associated with each of the seven two-way beams 330a–330g are approximately below the 40 dB level. Further, it should be recognized that any loss in transmit gain or receive sensitivity is relatively insignificant and does not necessitate amplification using additional amplifiers. In addition, it should also be recognized that even though the seven two-way beams 330a–330g include slightly broader beamwidths than the seven two-way beams 130a–130g of FIG. 5, which affects the degree to which the detection coverage zone can be shaped, the seven two-way beams 330a–330g remain particularly useful in radar system applications.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

What is claimed is:

1. A transmit and receiving system comprising,
    a first array including a first plurality of antenna elements disposed to provide a transmit antenna adapted to provide a plurality of transmit beams each having a transmit pattern shape;
    a second array including a second different plurality of antenna element disposed to provide a receive antenna adapted to provide a plurality of receive beams each having a receive pattern shape;
    a beam switching system coupled to the first array being operative to selectively form a plurality of transmit beams; and
    a beam combining system coupled to the second array and being operative to selectively form at least one transmit beam; and
    a beam combining system coupled to the second array and being operative to selectively form a plurality of receive beams wherein the beam switching system and beam combining system are operative such that different combinations of transmit and receive beam pattern shapes can be used to provide a plurality of different two-way antenna patterns.

2. The system of claim 1, wherein the transmit array includes approximately twelve elements.

3. The system of claim 1, wherein the second plurality of antenna elements are arranged into a receive array including approximately four elements in azimuth and approximately six elements in elevation.

4. The system of claim 3, wherein the receive array includes approximately twenty-four elements.

5. The system of claim 3, wherein the first plurality of antenna elements are arranged into a transmit array including approximately four elements in azimuth and approximately three elements in elevation.

6. A transmit and receiving system comprising:
    a first array including a first plurality of antenna elements disposd to provide a transmit antenna;
    a second array including a second different plurality of antenna elements disposed to privide a receive antenna;
    a beam switching system coupled to the first array and being operative to selectively form at least one transmit beam, said beam switching system including a first beamforming circuit having a plurality of antenna ports and a plurality of switch with each of the plurality of antenna ports being coupled to a corresponding one of the first plurality of antenna elements; and a beam combining system coupled to the second array and being operative to selectively form a plurality of receive beams.

7. The system of claim 5, wherein the beam switching system further includes a first switch beam combining circuit having an input port and a plurality of output ports, each of the plurality of output ports being coupled to corresponding one of the plurality of switch ports of said first beamforming circuit.

8. The system of claim 6, wherein at least one attenuator is coupled to each one of the plurality of switch ports of the first beamforming circuit.

9. A transmit and receiving system comprising:

a first array including a first plurality of antenna elements disposed to provide a transmit antenna;

a second array including a second different plurality of antenna elements disposed to provide a receive antenna;

a beam switching system coupled to the first array and being operative to selectively form at least one transmit beam, said beam switching system including:

a beamformer circuit having a plurality of beamformer circuit antenna element ports and a plurality of beamformer circuit switch ports; and a switch circuit having a plurality of switch ports and a common port with each of the plurality of switch ports being coupled to a corresponding one of the plurality of beamformer circuit switch ports; and a beaming combining system coupled to the second array and being operative to selectively form of plurality of receive beams.

10. The system of claim 9, wherein the beam combining system further includes:

a second beamforming circuit having a plurality of beamformer circuit antenna element ports coupled to the second array and a plurality of beamformer circuit switch ports; and a switched beam combining circuit an output port and a plurality of input ports, each of the plurality of input ports being coupled to respective ones of the plurality of beamformer circuit switch ports of the second beamforming circuit.

11. The system of claim 10, wherein the switched beam combining circuit includes:

a first switch having an output port and a plurality of input ports, each of the plurality of input ports being coupled to first ones of the plurality of beamformer circuit switch ports of the second beamforming circuit; and a second switch having an output port and a plurality of input ports, each of the plurality of inputs ports being coupled to second ones of the plurality of beamformer circuit switch ports of the second beamforming circuit.

12. The system of claim 11, wherein the switched beam combining system further includes:

a power divider circuit having a first input coupled to the output port of the first switch, a second input coupled to the output port of the second switch and having an output coupled to an output of said switched beam combining system.

13. The system of claim 12, further comprising a receiver coupled to the output of said switched beam combining system.

* * * * *

UNITED STATES PATENT AND TRADEMARK OFFICE
CERTIFICATE OF CORRECTION

PATENT NO. : 6,995,730 B2 Page 1 of 1
APPLICATION NO. : 10/293880
DATED : February 7, 2006
INVENTOR(S) : Joseph S. Pleva et al.

It is certified that error appears in the above-identified patent and that said Letters Patent is hereby corrected as shown below:

Column 1, line 27 delete "trucks boats, airplanes and other vehicle" and replace with --trucks, boats, airplanes and other vehicles--.

Column 3, line 11 delete "diagram of beam" and replace with --diagram of a beam--.

Column 3, line 28 delete "of beam" and replace with --of a beam--.

Column 5, line 43 delete "beam-ports" and replace with --beam ports--.

Column 7, line 23 delete "combing" and replace with --combining--.

Column 8, line 33, after "array" insert --and--.

Column 8, delete lines 36-38.

Column 9, line 1 after "switch" insert --ports--.

Column 9, line 33 delete "the first occurrence of "of" form of plurality of" and replace with --a--.

Column 10, line 7 delete "circuit" an output port" and replace with --circuit having an output port--.

Signed and Sealed this

Second Day of September, 2008

JON W. DUDAS
*Director of the United States Patent and Trademark Office*